(12) United States Patent
Sivaperuman et al.

(10) Patent No.: US 8,127,182 B2
(45) Date of Patent: Feb. 28, 2012

(54) STORAGE UTILIZATION TO IMPROVE RELIABILITY USING IMPENDING FAILURE TRIGGERS

(75) Inventors: Ganesh Sivaperuman, Chennai (IN); Hariharan Kamalavannan, Chennai (IN); Suresh Dhanarajan, Krishnagiri (IN); Senthil Kannan, Pondicherry (IN)

(73) Assignee: LSI Corporation, Milpitas, CA (US)

( * ) Notice: Subject to any disclaimer, the term of this patent is extended or adjusted under 35 U.S.C. 154(b) by 263 days.

(21) Appl. No.: 12/211,188

(22) Filed: Sep. 16, 2008

(65) Prior Publication Data

US 2010/0070796 A1 Mar. 18, 2010

(51) Int. Cl.
*G06F 11/00* (2006.01)
(52) U.S. Cl. .................... 714/47.1; 714/6.22
(58) Field of Classification Search ............. 714/6–8, 714/47.1–47.3, 6.22
See application file for complete search history.

(56) References Cited

U.S. PATENT DOCUMENTS

| | | | |
|---|---|---|---|
| 5,911,779 A * | 6/1999 | Stallmo et al. .................... 714/6 |
| 6,223,252 B1 * | 4/2001 | Bandera et al. ............... 711/114 |
| 6,571,354 B1 * | 5/2003 | Parks et al. ....................... 714/7 |
| 6,598,174 B1 * | 7/2003 | Parks et al. ....................... 714/6 |
| 6,845,465 B2 * | 1/2005 | Hashemi ............................ 714/6 |
| 7,130,973 B1 * | 10/2006 | Chong et al. ................... 711/162 |
| 7,543,178 B2 * | 6/2009 | McNeill et al. .................... 714/6 |
| 7,587,626 B2 * | 9/2009 | Terry et al. ........................ 714/6 |
| 2004/0078454 A1 * | 4/2004 | Abrahams et al. ............. 709/221 |
| 2008/0151724 A1 * | 6/2008 | Anderson et al. .......... 369/53.42 |

OTHER PUBLICATIONS

Patterson, David; Garth A. Gibson, Randy Katz (1988). "A Case for Redundant Arrays of Inexpensive Disks (RAID)". SIGMOD Conference: pp. 109-116. retrieved Dec. 31, 2006.
http://en.wikipedia.org/w/index.php?title=RAID&printable=yes; date retrieved Jun. 18, 2008.

* cited by examiner

*Primary Examiner* — Bryce Bonzo
(74) *Attorney, Agent, or Firm* — Alexander J. Neudeck; Cochran Freund & Young LLC

(57) ABSTRACT

Disclosed is a method of improving storage reliability comprising receiving an indicator of an impending failure of a first storage device in a RAID group. In response to the indicator, writing data to the first storage device is ceased. A first block of data directed to be written on the first storage device is written to a memory device. Data stored on the first storage device is copied to a second storage device. The first block of data is copied from the memory device to the second storage device. The RAID group is operated with the second storage device functioning in place of the first storage device. Data is read from said second storage device.

15 Claims, 4 Drawing Sheets

STORAGE UTILIZATION TO IMPROVE RELIABILITY USING IMPENDING FAILURE TRIGGERS

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks. These arrays may be configured in ways that provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID). The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise a method of improving storage reliability, comprising receiving an indicator of an impending failure of a first storage device in a RAID group; in response to said indicator, ceasing writing data to said first storage device; writing, to a memory device, a first block of data directed to be written on said first storage device; copying data stored on said first storage device to a second storage device; copying said first block of data from said memory device to said second storage device; operating said RAID group with said second storage device functioning in place of said first storage device; and, reading data from said second storage device.

An embodiment of the invention may therefore further comprise a method of improving storage reliability, comprising receiving an indicator of an impending failure of a first storage device in a RAID group; in response to said indicator, ceasing writing data to said first storage device; writing, to a memory device, a first block of data directed to be written on said first storage device; copying data stored on said first storage device to a first portion of a second storage device that is unused, wherein a second portion of said second storage device is part of a second RAID group; copying said first block of data from said memory device to said first portion of said second storage device; operating said RAID group with said first portion of said second storage device functioning in place of at least a portion of said first storage device; and, reading data from said first portion of said second storage device.

DETAILED DESCRIPTION OF THE EMBODIMENTS

Figure 1:
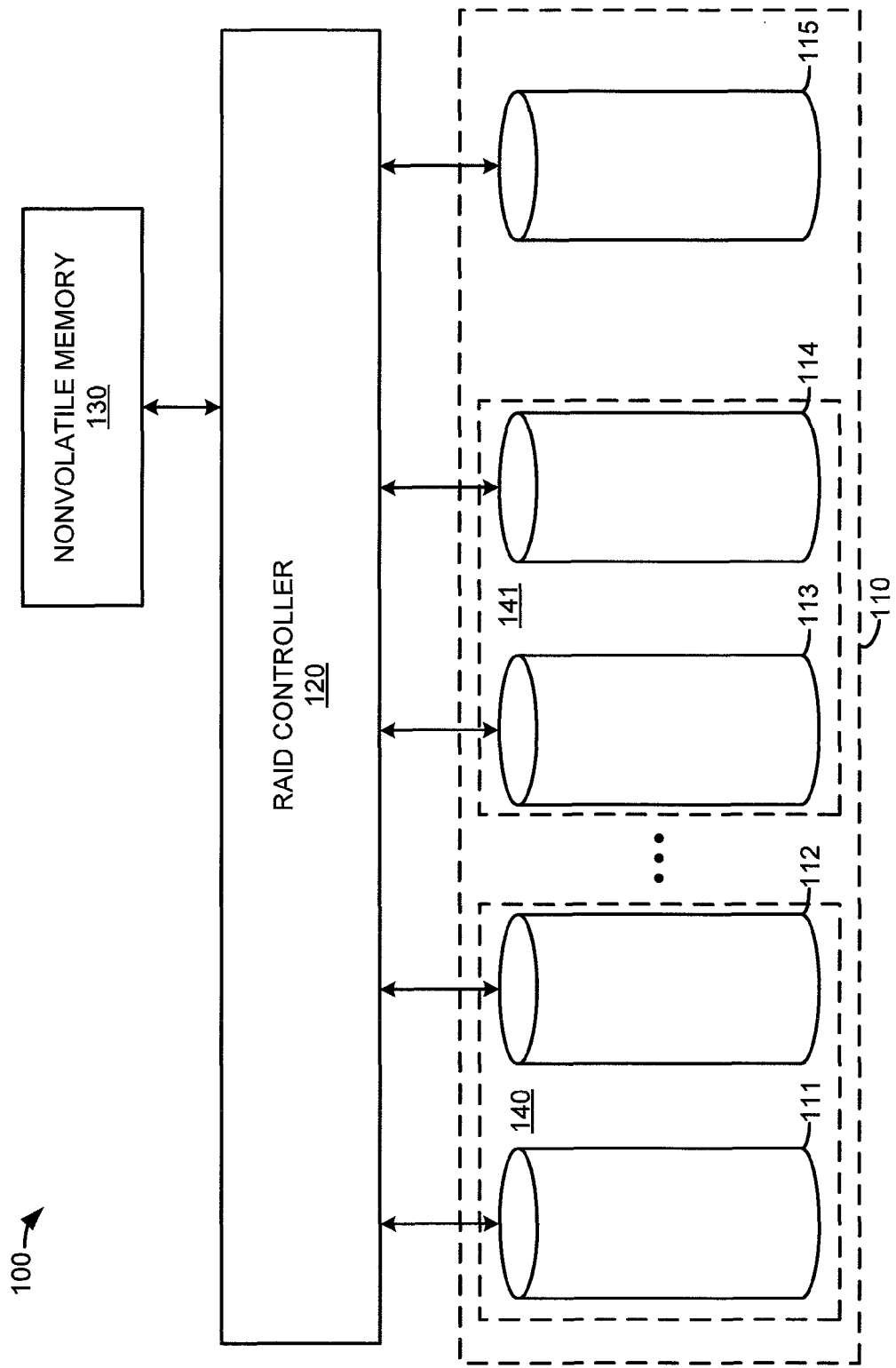
FIG. 1 is a block diagram illustrating a storage system.

FIG. 1 is a block diagram illustrating a storage system. In FIG. 1, storage system 100 comprises drive group 110, RAID controller 120, and nonvolatile memory 130. Drive group 110 is comprised of a plurality of RAID groups illustrated by RAID group 140 and RAID group 141. Drive group 110 also includes spare drive 115. RAID group 140 is comprised of drive 112 and failing drive 111. RAID group 141 is comprised of drive 113 and drive 114.

Nonvolatile memory 130 is preferably comprised of solid state nonvolatile memories. For example, nonvolatile memory 130 may be a solid state disk drive. Thus, nonvolatile memory 130 may communicate with RAID controller 120 using commands and procedures that are similar to those RAID controller 120 uses to communicate with drives 111-114.

In an embodiment, RAID controller 120 may receive an indication of an impending failure of failing drive 111. This indication may be supplied to RAID controller 120 by failing drive 111 using Self-Monitoring, Analysis, and Reporting Technology (SMART). SMART is a monitoring system for computer hard drives to detect and report on various indicators of reliability to provide indications of impending failures. SMART is further described in "Information technology—AT Attachment 8—ATA/ATAPI Command Set (ATA8-ACS), working draft revision 3f" available from www.t13.org.

In an embodiment, failing drive 111 may provide RAID controller 120 with an indication that a failing drive 111 is in a condition that indicates an impending failure of failing drive 111. In an embodiment, when failing drive 111 provides RAID controller 120 with an indication of an impending failure, RAID controller 120 takes action to make a copy of the data on failing drive 111.

In an embodiment, in response to receiving an indication of an impending failure, RAID controller 120 checks configuration information for drive group 110 to determine if there is a spare drive 115. For example, spare drive 115 may be a drive configured as a hot spare drive. In another example, spare drive 115 may be a drive that has not been assigned to a RAID group 140-141 (i.e., an "unassigned" drive).

RAID controller 120 may then copy the data on failing drive 111 to spare drive 115. Before copying, RAID controller 120 may first determine if spare drive 115 is of greater than or equivalent capacity of failing drive 111.

In an embodiment, before copying, RAID controller 120 may stop further writes to failing drive 111. These writes may be re-directed to nonvolatile memory 130. Nonvolatile memory 130 may act as a write cache for writes of blocks of data that are directed to failing drive 111. Nonvolatile memory 130 may act as this write cache while data is being copied from failing drive 111 to spare drive 115. When RAID controller 120 completes the copy of data from failing drive 111 to spare drive 115, RAID controller 120 may copy the written blocks of data cached in nonvolatile memory 130 to spare drive 115. In other words, RAID controller may flush the cached writes stored in nonvolatile memory 130 to spare drive 115. RAID controller 120 may then operate RAID group 140 with spare drive 115 functioning in place of failing drive 111.

In an embodiment, RAID controller 120 may not copy the data on failing drive 111 directly from failing drive 111. Instead, RAID controller may use one or more non-failing drives (such as drive 112) of RAID group 140 to reconstruct the data on failing drive 111. This reconstructed image of the data on failing drive 111 may be copied to spare drive 115. The data stored on failing drive 111 may be reconstructed using one or more RAID techniques. Thus, if failing drive 111 fails during the copying of data to spare drive 115, the copying operation is unaffected.

Figure 2:
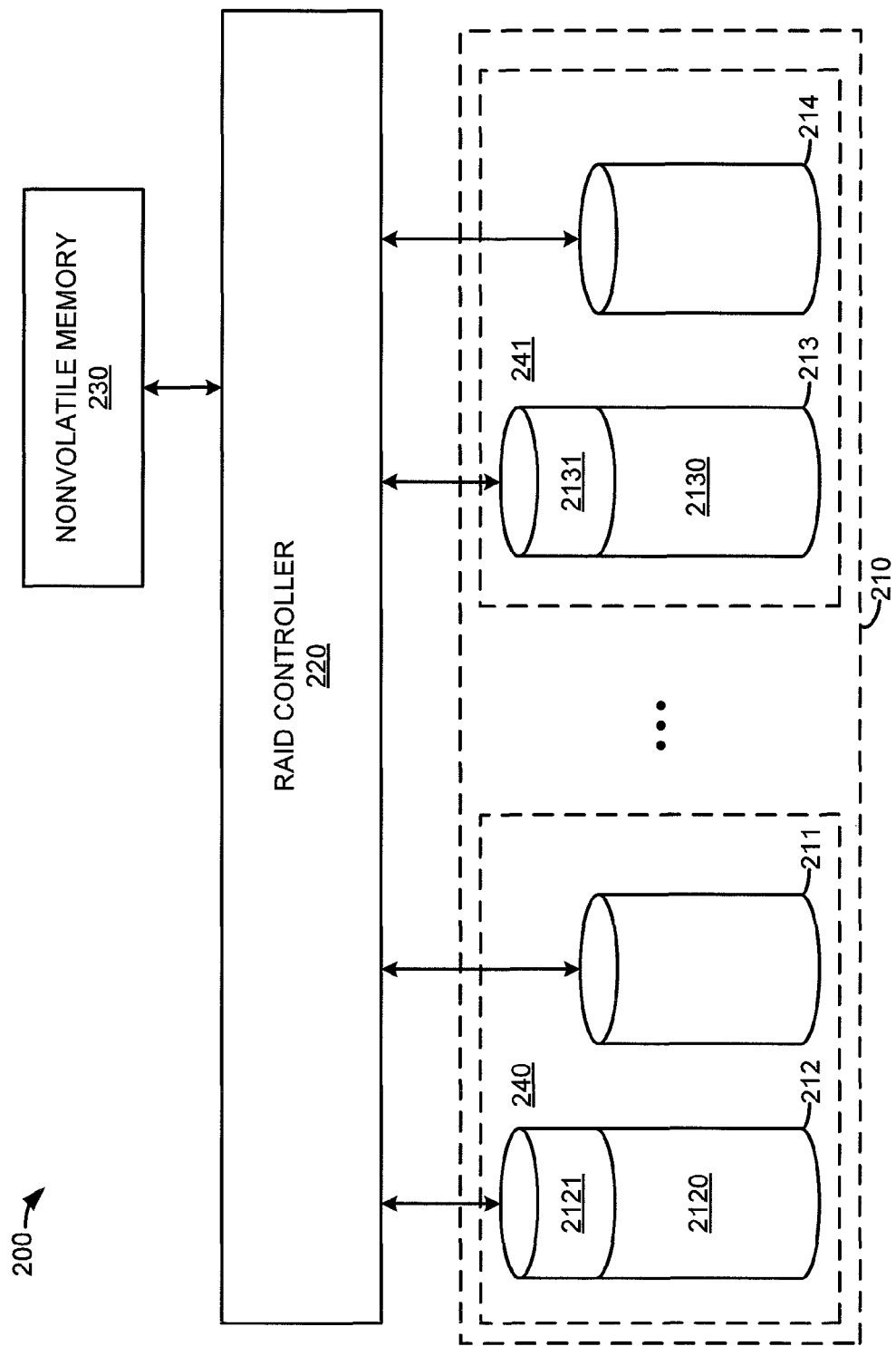
FIG. 2 is a block diagram illustrating a storage system.

FIG. 2 is a block diagram illustrating a storage system. In FIG. 2, storage system 200 comprises drive group 210, RAID controller 220, and nonvolatile memory 230. Drive group 210 is comprised of a plurality of RAID groups illustrated by RAID group 240 and RAID group 241. RAID group 240 is comprised of drive 212 and failing drive 211. RAID group 241 is comprised of drive 213 and drive 214. Drive 212 is shown partitioned into drive portion 2120 and unused drive portion 2121. Drive 213 is shown partitioned into drive portion 2130 and unused drive portion 2131.

Nonvolatile memory 230 is preferably comprised of solid state nonvolatile memories. For example, nonvolatile memory 230 may be a solid state disk drive. Thus, nonvolatile memory 230 may communicate with RAID controller 220 using commands and procedures that are similar to those RAID controller 220 uses to communicate with drives 211-214.

In an embodiment, RAID controller 220 may receive an indication of an impending failure of failing drive 211. This indication may be supplied to RAID controller 220 by failing drive 211 using SMART. In an embodiment, failing drive 211 may provide RAID controller 220 with an indication that a failing drive 211 is in a condition that indicates an impending failure of failing drive 211. In an embodiment, when failing drive 211 provides RAID controller 220 with an indication of an impending failure, RAID controller 220 takes action to make a copy of the data on failing drive 211.

In an embodiment, in response to receiving an indication of an impending failure, RAID controller 220 checks configuration information for drive group 210 to determine if there is enough space on unused drive portions to receive a copy of the data on failing drive 211. In an embodiment, an unused drive portion may be an entire drive (such as an unallocated or hot swap drive) that has a smaller capacity than failing drive 211.

In particular, RAID controller 220 determines if there is enough space on unused drive portions that are on drives in RAID groups that are not part of the RAID group of failing drive 211. In other words, RAID controller 220 determines if there is enough space on unused drive portion 2131 (and other unused drive portions not part of RAID group 240) to receive a copy of the data on failing drive 211. In FIG. 2, this means that unused drive portion 2121 is not counted (or later used) for the purpose of receiving a copy of the data on failing drive 211. RAID controller 220 may then copy the data on failing drive 211 to the unused drive portions. In FIG. 2, these unused drive portions include unused drive portion 2131.

In an embodiment, before copying, RAID controller 220 may stop further writes to failing drive 211. These writes may be re-directed to nonvolatile memory 230. Nonvolatile memory 230 may act as a cache for writes of blocks of data that are directed to failing drive 211. Nonvolatile memory 230 may act as this write cache while data is being copied from failing drive 211 to unused drive portion 2131.

When RAID controller 220 completes the copy of data from failing drive 211 to the unused drive portions, RAID controller 220 may copy the written blocks of data cached in nonvolatile memory 230 to the unused drive portions. In other words, RAID controller may flush the cached writes stored by nonvolatile memory 230 to unused drive portion 2131. RAID controller 220 may then operate RAID group 240 with the unused drive portions (including unused drive portion 2131) functioning in place of failing drive 211.

In an embodiment, RAID controller 220 may not copy the data on failing drive 211 directly from failing drive 211. Instead, RAID controller may use one or more non-failing drives (such as drive 212) of RAID group 240 to reconstruct the data on failing drive 211. This reconstructed data on failing drive 211 may be copied to the unused drive portions. The data stored on failing drive 211 may be reconstructed using one or more RAID techniques. Thus, if failing drive 211 fails during the copying of data to the unused drive portions, the copying operation is unaffected.

Figure 3:
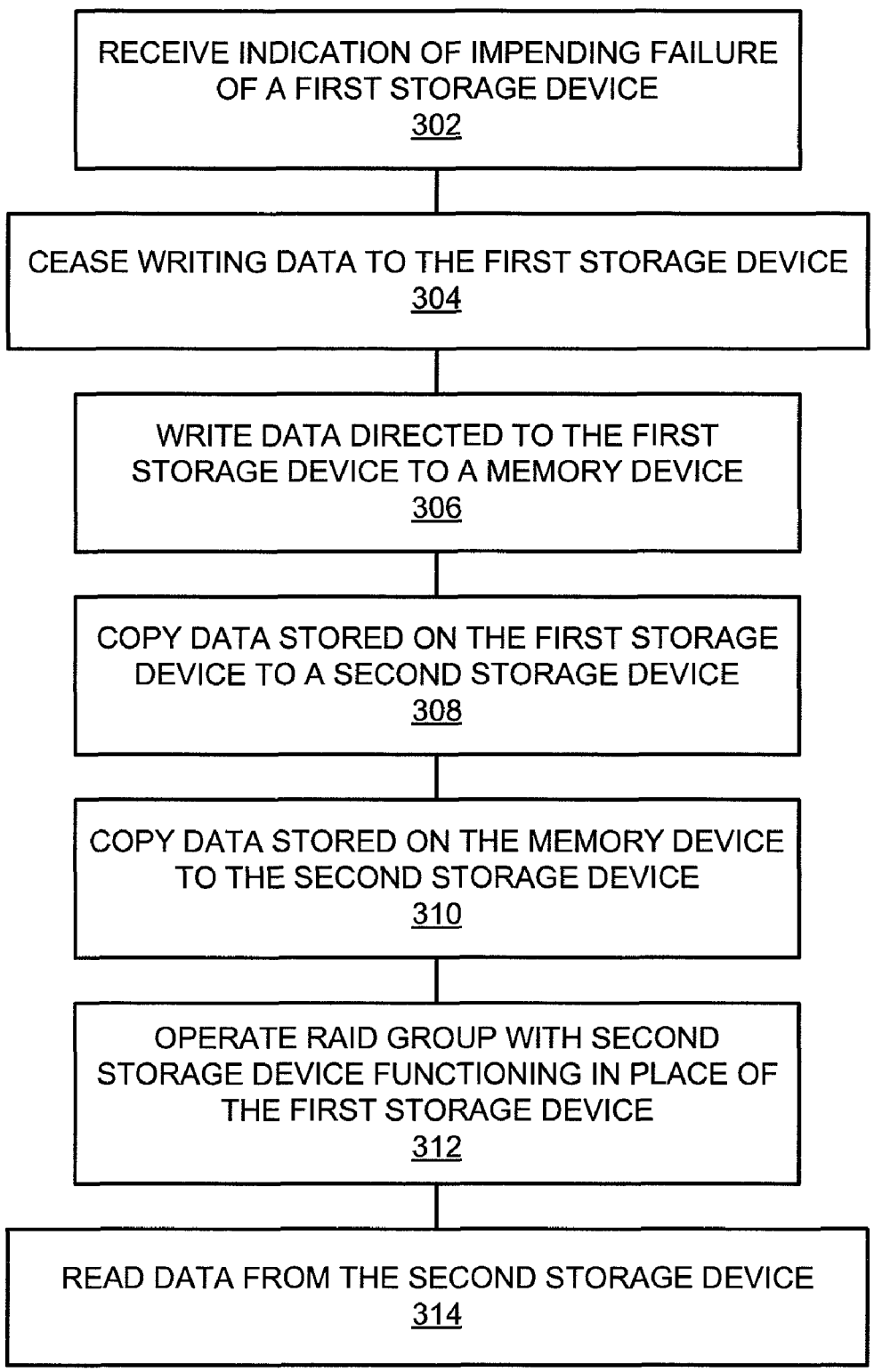
FIG. 3 is a flowchart illustrating a method of improving storage reliability.

FIG. 3 is a flowchart illustrating a method of improving storage reliability. The steps illustrated in FIG. 3 may be performed by one or more elements of storage system 100 or storage system 200.

An indication of the impending failure of a first storage device is received (302). For example, RAID controller 120 may receive an indication of the impending failure of failing drive 111. Writing data to the first storage device is ceased (304). For example, RAID controller 120 may cease writing data to failing drive 111. Data directed to the first storage device is written to a memory device (306). For example, RAID controller 120 may cache data directed to be written to failing drive 111 in nonvolatile memory 130.

Data stored on the first storage device is copied to a second storage device (308). For example, data stored on failing drive 111 may be copied to spare drive 115 by RAID controller 120. In an embodiment, the data copied to spare drive 115 may come directly from failing drive 111. In another embodiment, the data copied to spare drive may be a reconstruction of the data on failing drive 111. The data stored on failing drive 111 may be reconstructed using one or more RAID techniques.

Data stored on the memory device is copied to the second storage device (310). For example, write data that was cached by RAID controller 120 in nonvolatile memory 130 may be written to spare drive 115. The RAID group is operated with the second storage device functioning in place of the first storage device (312). For example, RAID group 140 may be operated by RAID controller 120 with spare drive 115 functioning in place of failing drive 111 within RAID group 140. Data is read from the second storage device (314). For example, RAID controller 120 may read data from spare drive 115 so that spare drive 115 may function in place of failing drive 111 in RAID group 140. In another example, RAID controller may read data from spare drive 115 in order to copy it to a new drive that has replaced failing drive 111 in RAID group 140. RAID controller 140 may then operate the new drive as part of RAID group 140.

Figure 4:
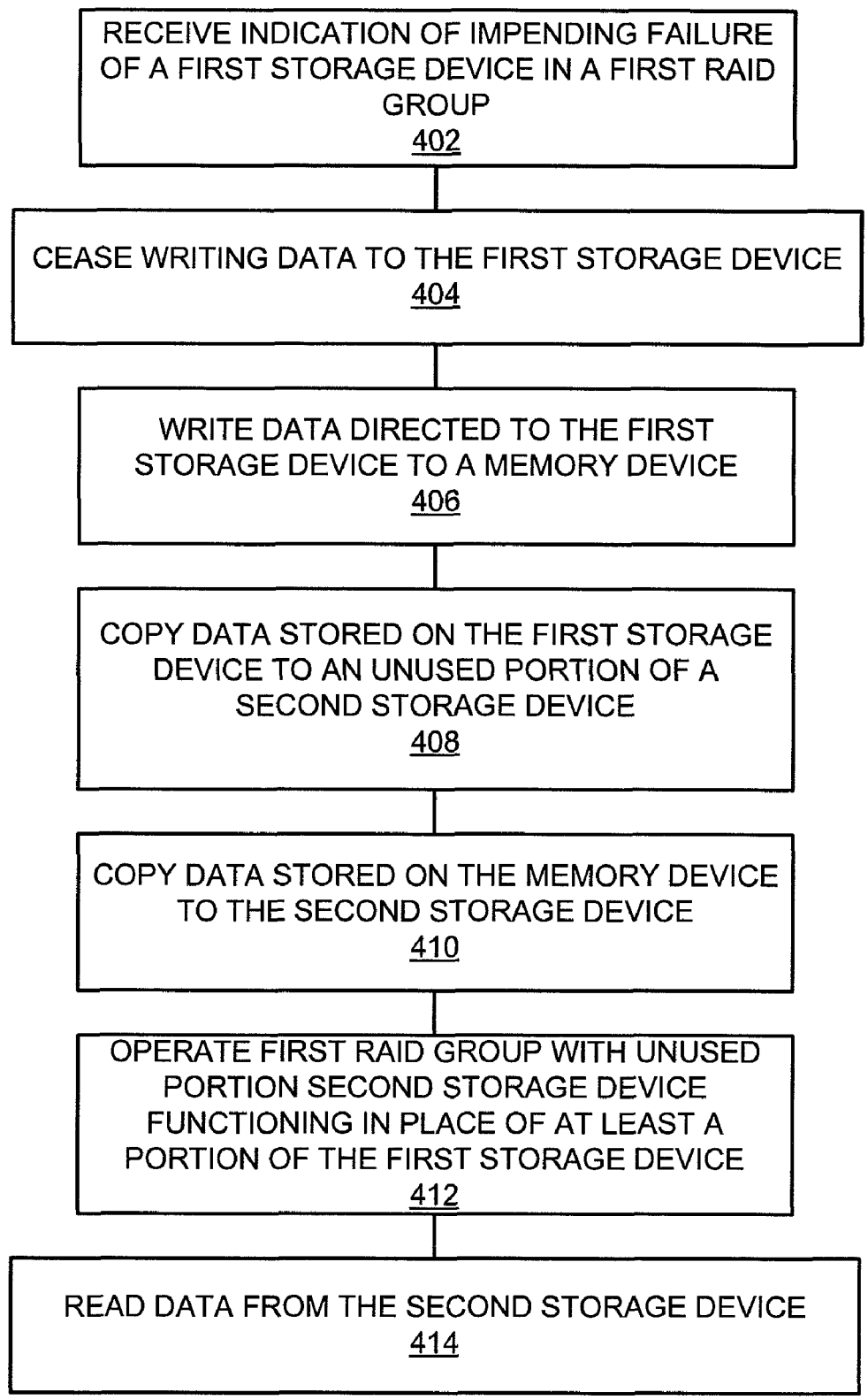
FIG. 4 is a flowchart illustrating a method of improving storage reliability.

FIG. 4 is a flowchart illustrating a method of improving storage reliability. The steps illustrated in FIG. 4 may be performed by one or more elements of storage system 100 or storage system 200.

An indication of the impending failure of a first storage device is received (402). For example, RAID controller 220 may receive an indication of the impending failure of failing drive 211. Writing data to the first storage device is ceased (404). For example, RAID controller 220 may cease writing data to failing drive 211. Data directed to the first storage device is written to a memory device (406). For example, RAID controller 220 may cache data directed to be written to failing drive 211 in nonvolatile memory 230.

Data stored on the first storage device is copied to an unused portion of a second storage device (408). For example, data stored on failing drive 211 may be copied to an unused portion of drive 213 by RAID controller 120. In an embodiment, the data copied to the unused portion of drive 213 may come directly from failing drive 211. In another embodiment, the data copied to the unused portion of drive 213 may be a reconstruction of the data on failing drive 211. The data stored on failing drive 211 may be reconstructed using one or more RAID techniques.

Data stored on the memory device is copied to the second storage device (410). For example, write data that was cached by RAID controller 220 in nonvolatile memory 230 may be written to drive 213. In another example, write data that was cached by RAID controller 220 in nonvolatile memory 230 may be written to unused drive portion 2131. For example, write data that was cached by RAID controller 220 in nonvolatile memory 230 may be written to drive 213. The RAID group is operated with at least a portion of the second storage device functioning in place of at least a portion the first storage device (412). For example, RAID group 240 may be operated by RAID controller 220 with unused drive portion 2131 functioning in place of at least a portion of failing drive 211 within RAID group 240. Data is read from the second storage device (414). For example, RAID controller 220 may read data from drive 213 so that unused drive portion 2131 may function in place of at least a portion of failing drive 211 in RAID group 240. In another example, RAID controller 240 may read data from unused drive portion 2131 in order to copy it to a new drive that has replaced failing drive 211 in RAID group 240. RAID controller 240 may then operate the new drive as part of RAID group 240.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of improving storage reliability, comprising:
   receiving an indicator of an impending failure of a first storage device in a RAID group;
   in response to said indicator, ceasing writing data to said first storage device while said first storage device is still operational;
   in response to said indicator, writing, to a nonvolatile solid state memory device, a first block of data directed to be written on said first storage device after writing data to said first storage device is ceased;
   in response to said indicator, copying data stored on said first storage device to a second storage device after writing data to said first storage device is ceased;
   in response to said indicator, copying said first block of data from said nonvolatile solid state memory device to said second storage device;
   after said copying data stored on said first device to said second storage device and said copying said first block of data from said nonvolatile solid state memory device to said second storage device completes, operating said RAID group with said second storage device functioning in place of said first storage device; and,
   reading data from said second storage device.

2. The method of claim 1 wherein said indicator is based on self-monitoring, analysis, and reporting technology.

3. The method of claim 1 wherein, before receiving said indicator, said second storage device is not assigned to a RAID group.

4. The method of claim 3, wherein said second storage device is a hot spare disk drive.

5. The method of claim 3, wherein said second storage device is an unassigned disk drive.

6. The method of claim 1, wherein said step of copying comprises reconstructing data stored on said first storage device from data stored by said RAID group.

7. The method of claim 1, further comprising:
   copying data stored on said second storage device to a third storage device that has replaced said first storage device; and,
   operating said RAID group with said third storage device functioning in place of said first storage device.

8. A method of improving storage reliability, comprising:
   receiving an indicator of an impending failure of a first storage device in a RAID group;
   in response to said indicator, ceasing writing data to said first storage device while the first storage device is still operational;
   in response to said indicator, writing, to a nonvolatile solid state memory device, a first block of data directed to be written on said first storage device after writing data to said first storage device is ceased;
   in response to said indicator, copying data stored on said first storage device to a first portion of a second storage device after writing data to said first storage device is ceased, the first portion of the second storage device being unused, wherein a second portion of said second storage device is part of a second RAID group;
   in response to said indicator, copying said first block of data from said nonvolatile solid state memory device to said first portion of said second storage device;
   after said copying data stored on said first device to said first portion of said second storage device and said copying said first block of data from said nonvolatile solid state memory device to said first portion of said second storage device completes, operating said RAID group with said first portion of said second storage device functioning in place of at least a portion of said first storage device; and,
   reading data from said first portion of said second storage device.

9. The method of claim 8 wherein said indicator is based on self-monitoring, analysis, and reporting technology.

10. The method of claim 8, wherein said step of copying comprises reconstructing data stored on said first storage device from data stored by said RAID group.

11. The method of claim 8, further comprising:
    copying data stored on said first storage device to a first portion of a third storage device that is unused, wherein a second portion of said third storage device is part of a third RAID group.

12. The method of claim 8, further comprising:
    copying data stored on said first portion of said second storage device to a third storage device that has replaced said first storage device; and,
    operating said RAID group with said third storage device functioning in place of said first storage device.

13. A computer readable medium having instructions stored thereon for improving storage reliability that, when executed by a computer, at least direct the computer to:

receive an indicator of an impending failure of a first storage device in a RAID group;

while said first storage device is still operational, in response to said indicator, cease writing data to said first storage device;

in response to said indicator, write, to a nonvolatile solid state memory device, a first block of data directed to be written on said first storage device after writing data to said first storage device is ceased;

in response to said indicator, copy data stored on said first storage device to a first portion of a second storage device that is unused after writing data to said first storage device is ceased, wherein a second portion of said second storage device is part of a second RAID group;

in response to said indicator, copy said first block of data from said nonvolatile solid state memory device to said first portion of said second storage device;

after said copying data stored on said first device to said first portion of said second storage device and said copying said first block of data from said nonvolatile solid state memory device to said first portion of said second storage device completes, operate said RAID group with said first portion of said second storage device functioning in place of at least a portion of said first storage device; and, read data from said first portion of said second storage device.

14. The computer readable medium claim 13 wherein said indicator is based on self-monitoring, analysis, and reporting technology.

15. The computer readable medium of claim 13, wherein said copying said first block of data comprises reconstructing data stored on said first storage device from data stored by said RAID group.

* * * * *